United States Patent [19]

Aitcin

[11] 4,434,239
[45] Feb. 28, 1984

[54] PROCESS FOR MANUFACTURING CORDIERITE COMPOSITIONS

[75] Inventor: Pierre C. Aitcin, Sherbrooke, Canada

[73] Assignee: Universite De Montreal, Quebec, Canada

[21] Appl. No.: 467,882

[22] Filed: Feb. 18, 1983

[30] Foreign Application Priority Data

Feb. 19, 1982 [CA] Canada .................................. 396,606

[51] Int. Cl.³ ...................... C04B 35/04; C04B 35/18; C04B 35/20
[52] U.S. Cl. ................................... 501/118; 501/119; 501/155
[58] Field of Search ....................... 501/118, 119, 155

[56] References Cited

U.S. PATENT DOCUMENTS

| | | | |
|---|---|---|---|
| 3,954,672 | 5/1976 | Somers et al. | 501/119 |
| 3,979,216 | 9/1976 | Fritsch et al. | 501/119 |
| 4,001,028 | 1/1977 | Frost et al. | 501/118 |
| 4,015,048 | 3/1977 | Martin | 501/9 |
| 4,063,955 | 12/1977 | Fritsch et al. | 501/9 |
| 4,125,408 | 11/1978 | Dieper | 501/119 |
| 4,287,167 | 9/1981 | Aitcin | 501/119 |
| 4,320,022 | 3/1982 | Aitcin | 252/62.59 |

FOREIGN PATENT DOCUMENTS

| | | | |
|---|---|---|---|
| 2398704 | 3/1979 | France | 501/155 |
| 688477 | 10/1979 | U.S.S.R. | 501/155 |

*Primary Examiner*—Mark Bell
*Attorney, Agent, or Firm*—Cushman, Darby & Cushman

[57] ABSTRACT

A process for the manufacture of industrial cordierite ceramic units containing from 45 to 68% by weight of silica 16 to 37% by weight of magnesia and 12 to 45% by weight of alumina which comprises (a) mixing from 15 to 60% by weight of the non-magnetic fraction of asbestos tailings having a $MgO:SiO_2$ of from 0.8 to 1.25 with 40 to 85% of a kaolin clay by weight and 0 to 10% of alumina; (b) shaping said mixture in green unit forms; (c) curing said units at room temperature for 24 h then at 110° C. for 24 h; (d) firing said cured units at a temperature of from 1350 1400° C.

1 Claim, No Drawings

PROCESS FOR MANUFACTURING CORDIERITE COMPOSITIONS

BACKGROUND OF THE INVENTION

A study of the prior art relative to the manufacture or cordierite and cordierite-like ceramic units show that the ingredients are selected based on the use of the sintered ceramic unit. In general, the ingredients used in making the green units comprise clay, talc and alumina, which contribute the three oxides needed for cordierite namely magnesium oxide, alumina and silica sometimes referred to as the MAS system (magnesia-alumina-silica) (See U.S. Pat. No. 3,979,216 C. W. Fritsch).

Since cordierite in general has two main essential properties, namely, low thermal expansion and thermal shock resistance to varying degrees depending on the intended use of the ceramic unit made therefrom, the composition of the cordierite will vary accordingly.

For example, cordierite can be made by mixing pure oxides of magnesium, aluminum and silicon in proportions such as to give the desired cordierite composition (See U.S. Pat. No. 4,063,955). Obviously the cost of preparing such oxides can be very expensive. In an attempt to reduce the cost products readily available in nature such as clay which contains alumina and silica and talc which contains magnesia and silica have been used in association with pure alumina.

Variations of these three components and addition of other ingredients will be made depending on the specific properties desired in the cordierite ceramic products. For example, the replacement of part of the clay by calcined clay, part or all of the talc by calcined talc and part of all of the alumina by calcined alumina has been found useful in the preparation of catalytic converters for automobile exhaust systems as disclosed in U.S. Pat. No. 4,001,028 Frost et al. In the preparation of glass-ceramic products useful for coating ceramics, glass-ceramics or glass articles, it has been proposed to add one or more modifying oxides such as lead oxide, barium oxide, strontium oxide and calcium oxide (See U.S. Pat. No. 4,015,048 F. W. Martin). The control of sodium oxide and potassium oxide by replacing the clay by calcined kyanite or mullite has been proposed in U.S. Pat. No. 3,954,672, Somers et al, for making ceramic bodies such as turbine engine components, heat exchanger cores and furnace ware.

In U.S. Pat. No. 4,125,408, P. S. Peiper discloses the use of a high magnesium clay or saponite and tremolite in association with a kaolin type clay and alumina to produce a composition which can be fired at below 1300° C. to produce a cordierite-like ceramic of low thermal expansion characteristics.

SUMMARY OF THE INVENTION

In accordance with the present invention there is provided processes for the manufacture of industrial cordierite ceramic units containing from 45 to 68% $SiO_2$, 6 to 37% MgO and 12 to 45% $Al_2O_3$.

Essentially one group of cordierite ceramic units containing from 50 to 68% $SiO_2$, 6 to 34% MgO and 12 to 37% $Al_2O_3$ is obtained by starting from a mixture of 15 to 60% of a demagnetized fraction of asbestos residues and 85 to 40% of a kaolin containing clay. This mixture avoids the use of alumina which is a relatively expensive material.

In another aspect of the present invention up to 10% of alumina can be added to the previous starting mixture and still provide a ceramic product possessing advantageous ceramic units.

DETAILED DESCRIPTION OF THE INVENTION

Asbestos Tailings

The chrysotile asbestos tailings used in accordance with the present invention are those passing a −28 or preferably −50 mesh sieve. It is known that the mesh size of asbestos tailings is conditioned by the in-plant treatment of the asbestos rock to extract the asbestos fibers due the geological history of the asbestos deposit.

Magnetic Concentration

The magnetic concentration step is carried out under dry conditions i.e. the tailings are caused to pass over a magnet whereby a magnetic fraction is discarded and the non-magnetic fraction is recovered for processing in accordance with the present invention. As an example of a suitable magnetic concentrator there may be mentioned a multiple magnetic drum separator marketed under the trademark MORTSELL. The percentage of the treated asbestos tailings retained by the magnet will vary with the size of the tailings, the particular components of each mine and the magnetic intensity. Generally speaking, the percentage of the non-magnetic fraction of tailings obtained in the magnetic concentration step will vary from about 65 to about 80% by weight of the initial tailings.

Calcination

Once the non-magnetic fraction has been isolated from the starting asbestos tailings, it can be submitted to calcination in a kiln at a temperature of from about 1250° C. to about 1400° C., thereby producing a dehydrated granular material. The calcination step serves to eliminate the water of crystallization so that when the calcined non-magnetic fraction is subjected to firing in the production of cordierite there will be no appreciable loss of weight and a very low shrinkage.

Chemically, the calcined non-magnetic fraction obtained from chrysotile asbestos tailings constitutes a novel mateial not found in nature. Its main constituents comprise 45 to 55% MgO, 48 to 43% $SiO_2$, the remaining elements being iron oxide (less than 2%) nickel oxide less than 0.5%, chromium oxide less than 0.5%.

The non-magnetic fraction of asbestos tailings used in accordance with the present invention has a basicity index or an $MgO:SiO_2$ ratio of from 0.8 to 1.25.

Kaolin Rich Clay

The selected kaolin rich clay used in accordance with the present invention is one which is characterized by having an alumina content of from 30 to 40% by weight (uncalcined). The term kaolin rich clay whenever used herein is intended to mean a clay having more or less the following composition $Al_2O_3.2SiO_2.2H_2O$.

As an example of a suitable kaolin rich clay there may be mentioned the clay well known as Georgia kaolin in the ceramic industry. The clay may optionally be totally or partially calcined in a manner well known in the art.

Mixing, Pressing and Heating

The kaolin rich clay and the non-magnetic asbestos tailings fraction are mixed in accordance with standard procedures used in the ceramic arts to increase the bulk density of the mixture. In such a mixture there is used from 85 to 40% by weight of kaolin rich clay and 15 to 60% by weight of the non-magnetic asbestos tailings fraction. When it is decided to prepare a cordierite having a quite high alumina content, there is added pure alumina to the previous mixture and the amount of alumina added can be up to 10% or less with 90% or more of the kaolin rich clay and the non-magnetic asbestos tailings fraction mixture.

The mixture is agglomerated into units of the desired shape by any of the known and conventional ceramic forming techniques such as pressing, extruding, casting etc. to yield a green ceramic unit of the desired shape.

The firing of the green ceramic units is carried out as follows. The units are heated at a rate of up to 150° C. per hour, within the range of from 1350° to 1400° C. Heating at a faster rate would result in mechanical failure of the green ceramic units. The units are then maintained within this temperature range for a period of time dependent upon the particular temperature. At about 1350° C. the time should be at least six hours and preferably at least about ten hours to achieve the desired final properties. Sintering should not be carried out outside this temperature range since this will result in failure to develop the required microstructure and cordierite composition necessary for the development of microcracks upon cooling.

Advantages

There are three main advantages in using the starting compositions of the present invention. First when starting with the mixture of a kaolin rich clay and non-magnetic fraction of asbestos tailings, most of the time the use of the expensive alumina is avoided while still producing ceramic bodies with low thermal expansion and heat shock properties.

A great advantage in using the non-magnetic fraction of asbestos tailings is the exceeding low percentage content of alkalis such as sodium oxide and potassium oxide. In fact this percentage is less than 0.1% which contributes to improve the heat schock characteristics of the cordierite product produced therefrom.

Furthermore, the molded green product is much more resistant than many of the prior art products and thus much easier to handle because of the fibrous structure of a part of the asbestos tailings.

The handling properties of the green product can be improved by incorporating therein a binder such as a lignosulfonate salt such as any of the lignosulfonate salts sold under the trademark LIGNOSOL ®.

The present invention will be more readily understood by referring to the following Examples which are given to illustrate rather than limit the scope of the invention.

EXAMPLES 1-3

Kaolin and demagnetized asbestos tailings in the amounts shown in Table III were dry mixed in a porcelain jar for 3 hours. Then a 5% solution of sodium lignosulfonate (available under the trademark LIGNOSOL ®) prepared from a 20% diluted solution obtained by mixing 40 mL of pure water with 10 mL of pure LIGNOSOL ® was added to the mixture obtained and mixing was continued for 3 hours in a high speed mixer. The homogeneous mixture was then pressed into units at 10,000 psi. The green units were dried in an oven for 24 hours at 50° C. and a further 24 hours at 110° C. The dried units were then fired in a kiln by raising the temperature at a rate of 150° C. per hour. When the temperature reached 700° C., it was maintained for 1½ hours, and again at 1000° C. it was maintained for 1½ hrs and when the temperature reached 1370° C. this temperature was maintained for 1½ hrs. The units were then cooled at a rate of 200° C. per hour.

Table I provides the chemical analysis of the starting kaolin and non-magnetic asbestos tailings.

TABLE I

| in percent | | $SiO_2$ | $Al_2O_3$ | MgO | $Fe_2O_3$ | $Na_2O$ | $K_2O$ | L.O.I | $MgO/SiO_2$ |
|---|---|---|---|---|---|---|---|---|---|
| kaolin | % | 45.2 | 37.3 | 0.23 | 0.46 | 0.02 | 0.05 | 15.1 | — |
| tailings (−50 mesh) | % | 35.9 | 0.6 | 43.8 | 1.9 | 0.02 | 0.05 | 16.9 | 1.22 |

Table II provides the % of kaolin and asbestos tailings used in each Example while Table III provides the quantities of each compounds used when starting with 1 kg of mix.

TABLE II

|  | Ex. 1 | Ex. 2 | Ex. 3 |
|---|---|---|---|
| kaolin | 67% | 50% | 40% |
| tailings | 33% | 50% | 60% |

TABLE III

|  | Ex. 1 | Ex. 2 | Ex. 3 |
|---|---|---|---|
| kaolin | 670 g | 500 g | 400 g |
| tailings | 330 g | 500 g | 600 g |

After cooling, the product obtained in each Example was analyzed and the results are reported in Table IV.

TABLE IV

|  | Ex. 1 | Ex. 2 | Ex. 3 |
|---|---|---|---|
| firing shrinkage | 7.4% | 8.4% | 8.9% |
| weight loss | 14.6% | 14.9% | 15.2% |
| specific gravity | 2.27 | 2.29 | 2.24 |
| absorption | 7% | 6.3% | 7.2% |

An X-ray examination has shown that the fired product was mostly composed of cordierite and thus suitable for the known uses of cordierite.

We claim:
1. Process for the manufacture of industrial cordierite ceramic units containing from 45 to 68% by weight of silica 16 to 37% by weight of magnesia and 12 to 45% by weight of alumina which comprises
   (a) mixing from 15 to 60% by weight of the non-magnetic fraction of asbestos tailings having a $MgO$:$SiO_2$ ratio of from 0.8 to 1.25 with 40 to 85% of a kaolin clay by weight and 0 to 10% of alumina;
   (b) shaping said mixture in green unit forms;
   (c) curing said units at room temperature for 24 h then at 110° C. for 24 h;
   (d) firing said cured units at a temperature of from 1350°-1400° C.

* * * * *